United States Patent
Xu

(10) Patent No.: US 10,224,988 B2
(45) Date of Patent: Mar. 5, 2019

(54) CSI-RS TRANSMISSION METHOD, NETWORK DEVICE, AND USER EQUIPMENT

(71) Applicant: Huawei Technologies Co., Ltd., Shenzhen, Guangdong (CN)

(72) Inventor: Kai Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/541,325

(22) PCT Filed: Dec. 31, 2014

(86) PCT No.: PCT/CN2014/095991
§ 371 (c)(1),
(2) Date: Jun. 30, 2017

(87) PCT Pub. No.: WO2016/106721
PCT Pub. Date: Jul. 7, 2016

(65) Prior Publication Data
US 2017/0359110 A1 Dec. 14, 2017

(51) Int. Cl.
*H04B 7/0456* (2017.01)
*H04W 24/00* (2009.01)
(Continued)

(52) U.S. Cl.
CPC ............ *H04B 7/0456* (2013.01); *H04B 7/00* (2013.01); *H04B 7/0417* (2013.01);
(Continued)

(58) Field of Classification Search
CPC .. H04B 7/0456; H04B 7/0634; H04B 7/0417; H04W 72/0413; H04L 5/0048
See application file for complete search history.

(56) References Cited

U.S. PATENT DOCUMENTS

2011/0310831 A1 12/2011 Bhattad et al.
2013/0039345 A1 2/2013 Kim et al.
(Continued)

FOREIGN PATENT DOCUMENTS

CN 102104994 A 6/2011
CN 103210605 A 7/2013
(Continued)

OTHER PUBLICATIONS

3GPP TR 36.897 v0.1.1 (Nov. 2014),"3rd Generation Partnership Project; Technical Specification Group Radio Access Network; Study on Elevation Beamforming/Full-Dimension (FD) MIMO for LTE (Release 13)", dated Nov. 1, 2014, total 14 pages.
(Continued)

*Primary Examiner* — Christine Ng

(57) ABSTRACT

The present invention relates to the field of communications technologies, and in particular, to a CSI-RS transmission method, a network device, and user equipment, so as to resolve a technical problem that a waste of power is relatively severe when a CSI-RS is transmitted. In embodiments of the present invention, a CSI-RS is precoded, which is equivalent to that beamforming is performed on the CSI-RS, so as to align with user equipment as far as possible when the CSI-RS is transmitted, thereby reducing a loss of transmit power in an environment and improving utilization of transmit power.

14 Claims, 4 Drawing Sheets

(51) Int. Cl.
*H04W 24/10* (2009.01)
*H04B 7/0417* (2017.01)
*H04B 7/06* (2006.01)
*H04L 5/00* (2006.01)
*H04W 72/04* (2009.01)
*H04B 7/00* (2006.01)

(52) U.S. Cl.
CPC ......... *H04B 7/0634* (2013.01); *H04L 5/0048* (2013.01); *H04W 24/00* (2013.01); *H04W 24/10* (2013.01); *H04W 72/0413* (2013.01)

(56) References Cited

U.S. PATENT DOCUMENTS

| | | | |
|---|---|---|---|
| 2013/0121318 A1 | 5/2013 | Zhang et al. | |
| 2013/0128820 A1 | 5/2013 | Yuan et al. | |
| 2014/0036809 A1* | 2/2014 | Xu | H04W 52/54 370/329 |
| 2014/0204770 A1 | 7/2014 | Mondal et al. | |
| 2015/0030006 A1* | 1/2015 | Fujio | H04B 7/0456 370/336 |
| 2015/0195020 A1* | 7/2015 | Zhu | H04B 7/0617 370/329 |
| 2016/0056873 A1 | 2/2016 | Wang et al. | |
| 2016/0142115 A1* | 5/2016 | Onggosanusi | H04B 7/0456 370/252 |
| 2016/0191273 A1 | 6/2016 | Nagata et al. | |

FOREIGN PATENT DOCUMENTS

| | | |
|---|---|---|
| EP | 2648445 A1 | 10/2013 |
| EP | 3145095 A1 | 3/2017 |
| JP | 2012524481 A | 10/2012 |
| JP | 2013537732 A | 10/2013 |
| JP | 2014053811 A | 3/2014 |
| JP | 2014053812 A | 3/2014 |
| JP | 2014526217 A | 10/2014 |

OTHER PUBLICATIONS

3GPP TS 36.211 V12.3.0 (Sep. 2014),"3rd Generation Partnership Project; Technical Specification Group Radio Access Network; Evolved Universal Terrestrial Radio Access (E-UTRA); Physical channels and modulation( Release 12)", dated Sep. 2014, total 124 pages.

3GPP TS 36.211 V10.0.0 (Dec. 2010), Technical Specification, 3rd Generation Partnership Project; Technical Specification Group Radio Access Network; Evolved Universal Terrestrial Radio Access (E-UTRA); Physical channels and modulation (Release 10), Dec. 22, 2010, 103 pages.

* cited by examiner

CSI-RS TRANSMISSION METHOD, NETWORK DEVICE, AND USER EQUIPMENT

CROSS-REFERENCE TO RELATED APPLICATIONS

This application is a National Stage of International Application No. PCT/CN2014/095991, filed on Dec. 31, 2014, which is hereby incorporated by reference in its entirety.

TECHNICAL FIELD

The present invention relates to the field of communications technologies, and in particular, to a CSI-RS transmission method, a network device, and user equipment.

BACKGROUND

Massive MIMO (Massive Multiple-Input Multiple-Output, massive multiple-input multiple-output) is considered to be a technology to be preferentially used to improve spectrum efficiency in 5G (a fifth generation mobile communications technology) and is widely accepted in the industry. In a Massive MIMO system, when transmitting a CSI-RS (Channel State Indication Reference Signal, channel state indication reference signal), a base station usually performs corresponding coverage enhancement mainly by using a method for improving transmit power of a transmit end. However, because the CSI-RS is transmitted in all directions, but there may be no user equipment in many transmission directions, a relatively large part of transmit power is absorbed by an ambient environment, and utilization of transmit power is relatively low, leading to a waste of power.

SUMMARY

Embodiments of the present invention provide a CSI-RS transmission method, a network device, and user equipment, so as to resolve a technical problem that a waste of power is relatively severe when a CSI-RS is transmitted.

A first aspect of the present invention provides a CSI-RS transmission method, including:
obtaining, by a network device, a first precoding matrix;
precoding, by the network device, a CSI-RS according to the first precoding matrix; and
sending, by the network device, the precoded CSI-RS to user equipment.

With reference to the first aspect, in a first possible implementation manner of the first aspect, the obtaining, by a network device, a first precoding matrix includes:
determining, by the network device, a quantity of ports used to send the CSI-RS to the user equipment; and
selecting, by the network device, a precoding matrix corresponding to the determined quantity of ports from a first precoding matrix codebook as the first precoding matrix.

With reference to the first possible implementation manner of the first aspect, in a second possible implementation manner of the first aspect, before the selecting, by the network device, a precoding matrix corresponding to the quantity of ports from a first precoding matrix codebook as the first precoding matrix, the method further includes:
selecting, by the network device, a precoding matrix from M CSI feedback precoding matrix codebooks, and constituting the first precoding matrix codebook by using the selected precoding matrix, where the first precoding matrix codebook includes a precoding matrix corresponding to at least two ports, and M is a positive integer.

With reference to the second possible implementation manner of the first aspect, in a third possible implementation manner of the first aspect, the selecting, by the network device, a precoding matrix from M CSI feedback precoding matrix codebooks, and constituting the first precoding matrix codebook by using the selected precoding matrix includes:
selecting, by the network device, a precoding matrix whose quantity of layers is equal to the determined quantity of ports from an $i^{th}$ CSI feedback precoding matrix codebook, where i is a positive integer, $1 \leq i \leq M$; and
adding, by the network device, the selected precoding matrix to the first precoding matrix codebook.

With reference to the first aspect or the first possible implementation manner, the second possible implementation manner, or the third possible implementation manner of the first aspect, in a fourth possible implementation manner of the first aspect, the method further includes:
receiving, by the network device, a feedback message of the user equipment for the first precoding matrix; and
if the feedback message indicates that a PMI corresponding to the first precoding matrix is not an available PMI of the CSI-RS, reobtaining, by the network device, the first precoding matrix; if the feedback message indicates that a PMI corresponding to the first precoding matrix is an available PMI of the CSI-RS, precoding, by the network device, the CSI-RS still according to the first precoding matrix, and sending the precoded CSI-RS to the user equipment.

With reference to the fourth possible implementation manner of the first aspect, in a fifth possible implementation manner of the first aspect, the receiving, by the network device, a feedback message of the user equipment for the first precoding matrix includes: receiving, by the network device, the feedback message of the user equipment for the first precoding matrix by using a PUCCH, an EPUCCH, or a PUSCH.

With reference to the fourth possible implementation manner of the first aspect, in a sixth possible implementation manner of the first aspect,
if the feedback message indicates that the PMI corresponding to the first precoding matrix is an available PMI of the CSI-RS, the feedback message includes the PMI or acknowledgement information that is used to indicate that the PMI is an available PMI of the CSI-RS; or
if the feedback message indicates that the PMI corresponding to the first precoding matrix is not an available PMI of the CSI-RS, the feedback message includes indication information of reobtaining the first precoding matrix or acknowledgement information that is used to indicate that the PMI is not an available PMI of the CSI-RS.

With reference to any one of the first aspect or the first possible implementation manner to the sixth possible implementation manner of the first aspect, in a seventh possible implementation manner of the first aspect, the sending, by the network device, the precoded CSI-RS to user equipment includes:
sending, by the network device, the precoded CSI-RS to the user equipment by using a PDCCH or an EPDCCH.

A second aspect of the present invention provides a CSI-RS transmission method, including:
receiving, by user equipment, a precoded channel state indication reference signal CSI-RS sent by a network device, where the precoded CSI-RS is obtained after the network device precodes a CSI-RS according to an obtained first precoding matrix.

With reference to the second aspect, in a first possible implementation manner of the second aspect, the method further includes:

sending, by the user equipment, a feedback message for the first precoding matrix to the network device.

With reference to the first possible implementation manner of the second aspect, in a second possible implementation manner of the second aspect, the method further includes:

comparing, by the user equipment, a parameter of the precoded CSI-RS with a preset parameter threshold, and generating the feedback message for the first precoding matrix according to a comparison result.

With reference to the second possible implementation manner of the second aspect, in a third possible implementation manner of the second aspect, the comparing, by the user equipment, a parameter of the precoded CSI-RS with a preset parameter threshold, and generating the feedback message for the first precoding matrix according to a comparison result includes:

comparing, by the user equipment, the parameter of the precoded CSI-RS with the preset parameter threshold; and if a relationship between the parameter of the precoded CSI-RS and the preset parameter threshold meets a preset condition, determining that the comparison result is that a precoding matrix indicator PMI corresponding to the first precoding matrix is an available PMI of the CSI-RS, and generating the feedback message for the first precoding matrix according to the comparison result; or comparing, by the user equipment, the parameter of the precoded CSI-RS with the preset parameter threshold; and if a relationship between the parameter of the precoded CSI-RS and the preset parameter threshold does not meet a preset condition, determining that the comparison result is that a PMI corresponding to the first precoding matrix is not an available PMI of the CSI-RS, and generating the feedback message for the first precoding matrix according to the comparison result.

With reference to the second aspect or the first possible implementation manner, the second possible implementation manner, or the third possible implementation manner of the second aspect, in a fourth possible implementation manner of the second aspect, if the feedback message indicates that the PMI corresponding to the first precoding matrix is an available PMI of the CSI-RS, the feedback message includes the PMI or acknowledgement information that is used to indicate that the PMI is an available PMI of the CSI-RS; or if the feedback message indicates that the PMI corresponding to the first precoding matrix is not an available PMI of the CSI-RS, the feedback message includes indication information of reobtaining the first precoding matrix or acknowledgement information that is used to indicate that the PMI is not an available PMI of the CSI-RS.

A third aspect of the present invention provides a network device, including:

an obtaining module, configured to obtain a first precoding matrix;

a precoding module, configured to precode a channel state indication reference signal CSI-RS according to the first precoding matrix; and a sending module, configured to send the precoded CSI-RS to user equipment.

With reference to the third aspect, in a first possible implementation manner of the third aspect, the obtaining module is specifically configured to:

determine a quantity of ports used to send the CSI-RS to the user equipment; and select a precoding matrix corresponding to the determined quantity of ports from a first precoding matrix codebook as the first precoding matrix.

With reference to the first possible implementation manner of the third aspect, in a second possible implementation manner of the third aspect, the obtaining module is further configured to: before selecting the precoding matrix corresponding to the quantity of ports from the first precoding matrix codebook as the first precoding matrix, select a precoding matrix from M CSI feedback precoding matrix codebooks, and constitute the first precoding matrix codebook by using the selected precoding matrix, where the first precoding matrix codebook includes a precoding matrix corresponding to at least two ports, and M is a positive integer.

With reference to the second possible implementation manner of the third aspect, in a third possible implementation manner of the third aspect, the obtaining module is further configured to:

select a precoding matrix whose quantity of layers is equal to the determined quantity of ports from an $i^{th}$ CSI feedback precoding matrix codebook, where i is a positive integer, and $1 \leq i \leq M$; and add the selected precoding matrix to the first precoding matrix codebook.

With reference to the third aspect or the first possible implementation manner, the second possible implementation manner, or the third possible implementation manner of the third aspect, in a fourth possible implementation manner of the third aspect, the network device further includes a receiving module, configured to receive a feedback message of the user equipment for the first precoding matrix; and if the feedback message indicates that a PMI corresponding to the first precoding matrix is not an available PMI of the CSI-RS, the obtaining module reobtains the first precoding matrix; or if the feedback message indicates that a PMI corresponding to the first precoding matrix is an available PMI of the CSI-RS, the precoding module precodes the CSI-RS still according to the first precoding matrix, and the sending module sends the precoded CSI-RS to the user equipment.

With reference to the fourth possible implementation manner of the third aspect, in a fifth possible implementation manner of the third aspect, the receiving module is specifically configured to receive the feedback message of the user equipment for the first precoding matrix by using a PUCCH, an EPUCCH, or a PUSCH.

With reference to any one of the third aspect or the first possible implementation manner to the fifth possible implementation manner of the third aspect, in a sixth possible implementation manner of the third aspect, the sending module is specifically configured to send the precoded CSI-RS to the user equipment by using a PDCCH or an EPDCCH.

A fourth aspect of the present invention provides user equipment, including:

a receiving module, configured to receive a precoded CSI-RS sent by a network device, where the precoded CSI-RS is obtained after the network device precodes a CSI-RS according to an obtained first precoding matrix.

With reference to the fourth aspect, in a first possible implementation manner of the fourth aspect, the user equipment further includes a sending module, configured to send a feedback message for the first precoding matrix to the network device.

With reference to the first possible implementation manner of the fourth aspect, in a second possible implementation manner of the fourth aspect, the user equipment further includes a comparison module, configured to compare a parameter of the precoded CSI-RS with a preset parameter threshold, and generate the feedback message for the first precoding matrix according to a comparison result.

With reference to the second possible implementation manner of the fourth aspect, in a third possible implementation manner of the fourth aspect, the comparison module is specifically configured to:

compare the parameter of the precoded CSI-RS with the preset parameter threshold; and if a relationship between the parameter of the precoded CSI-RS and the preset parameter threshold meets a preset condition, determine that the comparison result is that a PMI corresponding to the first precoding matrix is an available PMI of the CSI-RS, and generate the feedback message for the first precoding matrix according to the comparison result; or compare the parameter of the precoded CSI-RS with the preset parameter threshold; and if a relationship between the parameter of the precoded CSI-RS and the preset parameter threshold does not meet a preset condition, determine that the comparison result is that a PMI corresponding to the first precoding matrix is not an available PMI of the CSI-RS, and generate the feedback message for the first precoding matrix according to the comparison result.

A fifth aspect of the present invention provides a network device, including a memory, a processor, and a transmitter that are connected to a same bus, where the memory is configured to store an instruction; and the processor is configured to execute the instruction: obtaining a first precoding matrix, and precoding a CSI-RS according to the first precoding matrix; and the transmitter is configured to send the precoded CSI-RS to user equipment.

With reference to the fifth aspect, in a first possible implementation manner of the fifth aspect, the processor is specifically configured to:

determine a quantity of ports used to send the CSI-RS to the user equipment; and select a precoding matrix corresponding to the determined quantity of ports from a first precoding matrix codebook as the first precoding matrix.

With reference to the first possible implementation manner of the fifth aspect, in a second possible implementation manner of the fifth aspect, the processor is further configured to execute the instruction: before selecting the precoding matrix corresponding to the quantity of ports from the first precoding matrix codebook as the first precoding matrix, selecting a precoding matrix from M CSI feedback precoding matrix codebooks, and constituting the first precoding matrix codebook by using the selected precoding matrix, where the first precoding matrix codebook includes a precoding matrix corresponding to at least two ports, and M is a positive integer.

With reference to the second possible implementation manner of the fifth aspect, in a third possible implementation manner of the fifth aspect, the processor is further configured to:

select a precoding matrix whose quantity of layers is equal to the determined quantity of ports from an $i^{th}$ CSI feedback precoding matrix codebook, where i is a positive integer, and $1 \le i \le M$; and add the selected precoding matrix to the first precoding matrix codebook.

With reference to the fifth aspect or the first possible implementation manner, the second possible implementation manner, or the third possible implementation manner of the fifth aspect, in a fourth possible implementation manner of the fifth aspect, the network device further includes a receiver connected to the bus, where the receiver is configured to receive a feedback message of the user equipment for the first precoding matrix; and the processor is further configured to: if the feedback message indicates that a PMI corresponding to the first precoding matrix is not an available PMI of the CSI-RS, reobtain the first precoding matrix; if the feedback message indicates that a PMI corresponding to the first precoding matrix is an available PMI of the CSI-RS, precode the CSI-RS still according to the first precoding matrix, and send the precoded CSI-RS to the user equipment by using the transmitter.

With reference to the fourth possible implementation manner of the fifth aspect, in a fifth possible implementation manner of the fifth aspect, the receiver is specifically configured to receive the feedback message of the user equipment for the first precoding matrix by using a PUCCH, an EPUCCH, or a PUSCH.

With reference to any one of the fifth aspect or the first possible implementation manner to the fifth possible implementation manner of the fifth aspect, in a sixth possible implementation manner of the fifth aspect, the transmitter is specifically configured to send the precoded CSI-RS to the user equipment by using a PDCCH or an EPDCCH.

A sixth aspect of the present invention provides user equipment, including a receiver connected to a bus, where the receiver is configured to receive a precoded CSI-RS sent by a network device, where the precoded CSI-RS is obtained after the network device precodes a CSI-RS according to an obtained first precoding matrix.

With reference to the sixth aspect, in a first possible implementation manner of the sixth aspect, the user equipment further includes a transmitter connected to the bus, configured to send a feedback message for the first precoding matrix to the network device.

With reference to the first possible implementation manner of the sixth aspect, in a second possible implementation manner of the sixth aspect, the user equipment further includes a memory and a processor that are connected to the bus, where the memory is configured to store an instruction; and the processor is configured to execute the instruction: comparing a parameter of the precoded CSI-RS with a preset parameter threshold, and generating the feedback message for the first precoding matrix according to a comparison result.

With reference to the second possible implementation manner of the sixth aspect, in a third possible implementation manner of the sixth aspect, the processor is specifically configured to:

execute the instruction: comparing the parameter of the precoded CSI-RS with the preset parameter threshold; and if a relationship between the parameter of the precoded CSI-RS and the preset parameter threshold meets a preset condition, determining that the comparison result is that a PMI corresponding to the first precoding matrix is an available PMI of the CSI-RS, and generating the feedback message for the first precoding matrix according to the comparison result; or execute the instruction: comparing the parameter of the precoded CSI-RS with the preset parameter threshold; and if a relationship between the parameter of the precoded CSI-RS and the preset parameter threshold does not meet a preset condition, determining that the comparison result is that a PMI corresponding to the first precoding matrix is not an available PMI of the CSI-RS, and generating the feedback message for the first precoding matrix according to the comparison result.

In the embodiments of the present invention, when a network device is to transmit a CSI-RS to user equipment, the network device first needs to precode the CSI-RS according to an obtained precoding matrix, which is equivalent to that beamforming is performed on the CSI-RS, and sends the precoded CSI-RS to the user equipment. In this way, after receiving the precoded CSI-RS, the user equipment may compare a parameter of the precoded CSI-RS with a preset parameter threshold. For example, if a relationship between the parameter of the precoded CSI-RS and the preset parameter threshold meets a preset condition, the user equipment determines that power of the received signal is relatively high, and less power is wasted, which is equivalent to that, after beamforming is performed on the CSI-RS, a transmission direction of the precoded CSI-RS is basically aligned with the user equipment. Therefore, the precoded CSI-RS received by the user equipment has relatively high power, and the user equipment determines that the CSI-RS may be precoded by still using the precoding matrix. However, if a relationship between the parameter of the precoded CSI-RS and the preset parameter threshold does not meet a preset condition, the user equipment determines that power of the received signal is relatively low, and more power is wasted, which is equivalent to that, after beamforming is performed on the CSI-RS, a transmission direction of the precoded CSI-RS is not aligned with the user equipment. Therefore, the precoded CSI-RS received by the user equipment has relatively low power, and the user equipment determines that the CSI-RS may be not precoded by still using the precoding matrix. Therefore, the network device redetermines a precoding manner for the CSI-RS, for example, precodes the CSI-RS by reselecting a precoding matrix, and then sends the CSI-RS that is precoded again to the user equipment for performing determining, until a proper precoding matrix is selected for the user equipment.

In the embodiments of the present invention, a method for performing beamforming on a transmit end is used, to improve utilization of transmit power. Beamforming can greatly enlarge effective coverage of a CSI-RS, that is, the CSI-RS is transmitted to each user equipment as far as possible, thereby improving a data throughput and performance of an entire system. This plays a critical role in improving data transmission performance of a control-layer plane and a data plane.

DESCRIPTION OF EMBODIMENTS

Figure 1:
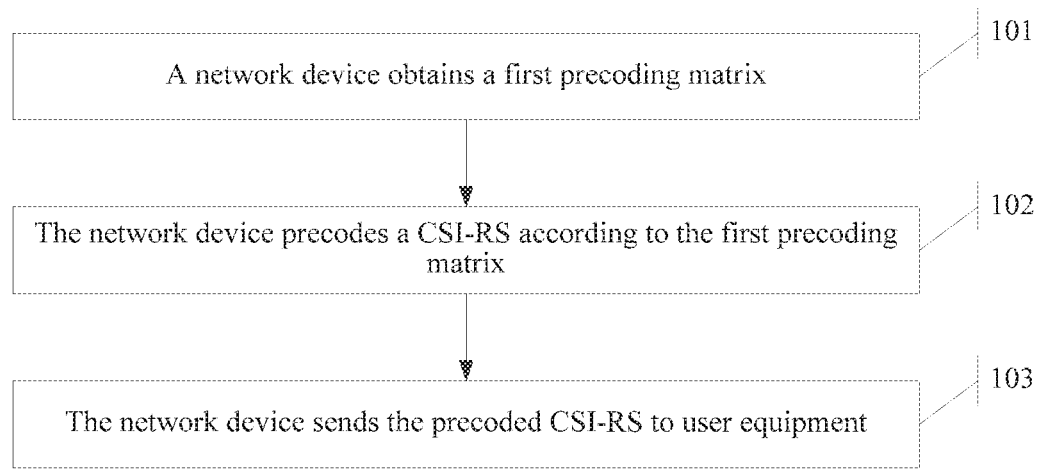
FIG. 1 is a main flowchart of a CSI-RS transmission method on a network device side according to an embodiment of the present invention.

Embodiments of the present invention provide a CSI-RS transmission method. The method includes: obtaining, by a network device, a first precoding matrix; precoding, by the network device, a CSI-RS according to the first precoding matrix; and sending, by the network device, the precoded CSI-RS to user equipment.

In the embodiments of the present invention, when a network device is to transmit a CSI-RS to user equipment, the network device first needs to precode the CSI-RS according to an obtained precoding matrix, which is equivalent to that beamforming is performed on the CSI-RS, and sends the precoded CSI-RS to the user equipment. In this way, after receiving the precoded CSI-RS, the user equipment may compare a parameter of the precoded CSI-RS with a preset parameter threshold. For example, if a relationship between the parameter of the precoded CSI-RS and the preset parameter threshold meets a preset condition, the user equipment determines that power of the received signal is relatively high, and less power is wasted, which is equivalent to that, after beamforming is performed on the CSI-RS, a transmission direction of the precoded CSI-RS is basically aligned with the user equipment. Therefore, the precoded CSI-RS received by the user equipment has relatively high power, and the user equipment determines that the CSI-RS may be precoded by still using the precoding matrix. However, if a relationship between the parameter of the precoded CSI-RS and the preset parameter threshold does not meet a preset condition, the user equipment determines that power of the received signal is relatively low, and more power is wasted, which is equivalent to that, after beamforming is performed on the CSI-RS, a transmission direction of the precoded CSI-RS is not aligned with the user equipment. Therefore, the precoded CSI-RS received by the user equipment has relatively low power, and the user equipment determines that the CSI-RS may be not precoded by still using the precoding matrix. Therefore, the network device redetermines a precoding manner for the CSI-RS, for example, precodes the CSI-RS by reselecting a precoding matrix, and then sends the CSI-RS that is precoded again to the user equipment for performing determining, until a proper precoding matrix is selected for the user equipment.

In the embodiments of the present invention, a method for performing beamforming on a transmit end is used, to improve utilization of transmit power. Beamforming can greatly enlarge effective coverage of a CSI-RS, that is, the CSI-RS is transmitted to each user equipment as far as possible, thereby improving a data throughput and performance of an entire system. This plays a critical role in improving data transmission performance of a control-layer plane and a data plane.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G (2nd Generation Mobile Communications Technology) and 3G (3rd Generation Mobile Communication Technology) communications systems and a next-generation communications system, for example, a Global System for Mobile Communications (Global System for Mobile Communications, GSM), a Code Division Multiple Access (Code Division Multiple Access, CDMA) system, a Time Division Multiple Access (Time Division Multiple Access, TDMA) system, Wideband Code Division Multiple Access (Wideband Code Division Multiple Access Wireless, WCDMA), a Frequency Division Multiple Access (Frequency Division Multiple Addressing, FDMA) system, an Orthogonal Frequency-Division Multiple Access (Orthogonal Frequency-Division Multiple Access, OFDMA) system, a single-carrier FDMA (SC-FDMA) system, a general packet radio service (General Packet Radio Service, GPRS) system, a Long Term Evolution (Long Term Evolution, LTE) system, and other communications systems.

This specification describes all aspects with reference to user equipment and/or a network device.

User equipment (User Equipment, UE) may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks by using a radio access network (such as a RAN (Radio Access Network)). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communications Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A network device, such as a base station (for example, an access point) may specifically refer to a device in communication with a wireless terminal by using one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS, Base Transceiver Station) in GSM or CDMA, may be a base station (NodeB) in WCDMA, or may be an evolved NodeB (NodeB, eNB, or e-NodeB, evolved Node B) in LTE, which is not limited in the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, unless otherwise specified.

The following further describes the embodiments of the present invention in detail with reference to accompanying drawings in this specification.

Referring to FIG. 1, an embodiment of the present invention provides a CSI-RS transmission method. The method may be applied to a network device. A main process of the method is described as follows:

Step 101: The network device obtains a first precoding matrix.

When the network device is to send a CSI-RS to the user equipment, the network device first needs to obtain a precoding matrix, to precode the CSI-RS according to the precoding matrix. In this embodiment of the present invention, the precoding matrix is referred to as the first precoding matrix.

Optionally, in this embodiment of the present invention, the obtaining, by the network device, a first precoding matrix includes:

determining, by the network device, a quantity of ports used to send the CSI-RS to the user equipment; and selecting, by the network device, a precoding matrix corresponding to the determined quantity of ports from a first precoding matrix codebook as the first precoding matrix.

The network device may correspond to multiple user equipments, and therefore, quantities of ports used by the network device to send the CSI-RS to different user equipments may be different. For example, for user equipment 1, the network device may send by using two ports; for user equipment 2, the network device may send by using four ports. The port herein refers to a logical port. For example, one port may correspond to five physical antennas. Certainly, an actual setting situation is not limited in the present invention, and the numerical value herein is merely used as an example.

In this embodiment of the present invention, the first precoding matrix codebook is a codebook constituted by precoding matrixes for specially precoding the CSI-RS. The first precoding matrix codebook may include at least one precoding matrix. A precoding matrix included in the first precoding matrix codebook corresponds to at least two ports. That is, for example, if the network device determines that two ports are used to send for the user equipment 1, the network device may select a precoding matrix corresponding to the two ports from the first precoding matrix codebook as a precoding matrix for the user equipment 1.

Therefore, before a precoding matrix is selected from the first precoding matrix codebook, the first precoding matrix codebook certainly needs to be generated first.

Optionally, in this embodiment of the present invention, the precoding matrix codebook needs to be generated before the network device selects the precoding matrix corresponding to the quantity of ports from the first precoding matrix codebook as the first precoding matrix, which specifically includes:

selecting, by the network device, a precoding matrix from M CSI feedback precoding matrix codebooks, and constituting the first precoding matrix codebook by using the selected precoding matrix, where the first precoding matrix codebook includes a precoding matrix corresponding to at least two ports, and M is a positive integer.

A CSI feedback precoding matrix codebook, that is, a CSI feedback (feedback) codebook, is an existing precoding matrix codebook in the prior art. Each CSI feedback precoding matrix codebook corresponds to one quantity of ports. Each CSI feedback precoding matrix codebook includes multiple precoding matrixes. These precoding matrixes may correspond to different quantities of layers. Certainly, one CSI feedback precoding matrix codebook may also have different precoding matrixes corresponding to a same quantity of layers.

The network device may respectively select a precoding matrix from the M CSI feedback precoding matrix codebooks, where a precoding matrix selected from a CSI precoding matrix codebook is a precoding matrix whose quantity of layers is equal to the quantity of ports corresponding to the CSI precoding matrix codebook.

Specifically, in this embodiment of the present invention, the selecting, by the network device, a precoding matrix from M CSI feedback precoding matrix codebooks, and constituting the first precoding matrix codebook by using the selected precoding matrix includes:

selecting, by the network device, a precoding matrix whose quantity of layers is equal to the determined quantity of ports from an $i^{th}$ CSI feedback precoding matrix codebook, where i is a positive integer, and $1 \leq i \leq M$; and adding, by the network device, the selected precoding matrix to the first precoding matrix codebook.

For example, if the quantity of ports corresponding to a CSI feedback precoding matrix codebook 1 is 2, when selecting a precoding matrix from the CSI feedback precoding matrix codebook 1, the network device selects a precoding matrix whose quantity of layers is 2, and adds the selected precoding matrix to the first precoding matrix codebook in this embodiment of the present invention. For another example, if the quantity of ports corresponding to a CSI feedback precoding matrix codebook 2 is 4, when selecting a precoding matrix from the CSI feedback precoding matrix codebook 2, the network device selects a precoding matrix whose quantity of layers is 4, and adds the selected precoding matrix to the first precoding matrix codebook in this embodiment of the present invention.

The network device may simultaneously process multiple CSI feedback precoding matrix codebooks, or may process all CSI feedback precoding matrix codebooks one by one, that is, may not only perform parallel processing, to improve processing efficiency, but also may perform serial processing, to reduce an error that may occur in a processing process.

There may be many CSI feedback precoding matrix codebooks. The network device may process all of the CSI feedback precoding matrix codebooks, and select a precoding matrix from the CSI feedback precoding matrix codebooks to constitute the first precoding matrix codebook in this embodiment of the present invention. In this way, an obtained result is relatively comprehensive, and CSI-RSs for different user equipments can be better processed. Alternatively, the network device may select some CSI feedback precoding matrixes from the CSI feedback precoding matrix codebooks to perform processing, and select a precoding matrix from these CSI feedback precoding matrix codebooks, to constitute the first precoding matrix codebook in this embodiment of the present invention. In this way, a processing process required by the network device is relatively simple, thereby reducing a burden of the network device and also reducing a processing time.

In this way, the first precoding matrix codebook in this embodiment of the present invention is generated, and the first precoding matrix codebook includes a precoding matrix corresponding to at least two ports. When the network device is to send the CSI-RS to user equipment, the network device may select, according to the quantity of ports corresponding to the user equipment, the first precoding matrix from the first precoding matrix codebook to precode the CSI-RS.

The following describes a specific example to describe how to constitute the first precoding matrix.

For example, refer to Table 1, which is a CSI feedback precoding matrix codebook. For example, a quantity of ports corresponding to the CSI feedback precoding matrix codebook is 4.

TABLE 1

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

CodeBook Index in Table 1 is an index of a codebook. Number of layers represents a quantity of layers (or may be referred to as a quantity of flows). One layer represents one data flow, that is, different layers represent different data flows.

W represents a particular matrix, and $u_n$ is a variable in W. For example, $W_1$ represents that $u_n$ in W is $u_1$. A superscript of W represents which columns are selected from the matrix W to constitute a new matrix. W, as a matrix, includes multiple columns. For example, $W^{\{1\}}$ represents that a first column is taken from the matrix of W to constitute a new matrix; $W^{\{1234\}}$ represents that a first column, a second column, a third column, and a fourth column are taken from the matrix of W to constitute a new matrix. For example, $W_1^{\{1234\}}$ represents that a first column, a second column, a third column, and a fourth column are taken from the matrix W to constitute a new matrix, where $u_n$ in the matrix W is $u_1$.

Because the quantity of ports corresponding to the CSI feedback precoding matrix codebook shown in Table 1 is 4, when a precoding matrix is to be selected from the CSI feedback precoding matrix codebook and is to be added to the first precoding matrix codebook, a column of precoding matrixes whose quantities of layers are 4 may be selected from Table 1, that is, a column of precoding matrixes in the rightmost part of Table 1 may be added to the first precoding matrix codebook.

For example, the first precoding matrix codebook in this embodiment of the present invention is shown in Table 2:

TABLE 2

| | Number of ports | | | |
|---|---|---|---|---|
| 2 | 4 | 8 | 16 | ......... |
| ......... | $W_0^{\{1234\}}/2$ | ......... | ......... | ......... |
| ......... | $W_1^{\{1234\}}/2$ | ......... | ......... | ......... |
| ......... | $W_2^{\{1234\}}/2$ | ......... | ......... | ......... |
| ......... | $W_3^{\{1234\}}/2$ | ......... | ......... | ......... |
| ......... | $W_4^{\{1234\}}/2$ | ......... | ......... | ......... |
| ......... | $W_5^{\{1234\}}/2$ | ......... | ......... | ......... |
| ......... | $W_6^{\{1234\}}/2$ | ......... | ......... | ......... |
| ......... | $W_7^{\{1234\}}/2$ | ......... | ......... | ......... |
| ......... | $W_8^{\{1234\}}/2$ | ......... | ......... | ......... |
| ......... | $W_9^{\{1234\}}/2$ | ......... | ......... | ......... |
| ......... | $W_{10}^{\{1234\}}/2$ | ......... | ......... | ......... |
| ......... | $W_{11}^{\{1234\}}/2$ | ......... | ......... | ......... |
| ......... | $W_{12}^{\{1234\}}/2$ | ......... | ......... | ......... |
| ......... | $W_{13}^{\{1234\}}/2$ | ......... | ......... | ......... |
| ......... | $W_{14}^{\{1234\}}/2$ | ......... | ......... | ......... |
| ......... | $W_{15}^{\{1234\}}/2$ | ......... | ......... | ......... |

It can be seen from Table 2 that, the network device adds the column of precoding matrixes whose quantities of layers are 4 in the CSI feedback precoding matrix codebook shown in Table 1 to the first precoding matrix codebook as precoding matrixes corresponding to the quantity of ports being 4. For a CSI feedback precoding matrix codebook corresponding to another quantity of ports, a same manner may also be used to perform processing.

Certainly, in this embodiment of the present invention, for different quantities of ports, quantities of precoding matrixes added to the first precoding matrix codebook may be the same or may be different. For example, it can be known from Table 2 that, there are 15 precoding matrixes that all correspond to the quantity of ports being 4 in the first precoding matrix codebook. For the quantity of ports being 2, the quantity of precoding matrixes, which corresponds to the quantity of ports being 2, in the first precoding matrix codebook may be 15 or may be not 15. For another quantity of ports, it is the same.

In addition, in Table 2, precoding matrixes whose quantities of layers are 4 in Table 1 all are added to the first precoding matrix codebook, so that a result can be more comprehensive, and there is a wider selection range during selection. In an actual application, only some of precoding matrixes whose quantities of layers are 4 may be selected from Table 1 and added to the first precoding matrix codebook, so that storage space divided for storing the first precoding matrix codebook may be reduced. For specifically selecting which precoding matrixes whose quantities of layers are 4 from Table 1 and adding the precoding matrixes to the first precoding matrix codebook, a selection manner may be arbitrary, for example, random selection may be performed, or selection may be performed according to any preset rule, which is not limited in the present invention.

For example, if some precoding matrixes whose quantity of layers is 4 are randomly selected from Table 1 and added to the first precoding matrix codebook, an obtained first precoding matrix codebook, for example, is shown in Table 3:

TABLE 3

| | Number of ports | | | |
|---|---|---|---|---|
| 2 | 4 | 8 | 16 | ......... |
| ......... | $W_0^{\{1234\}}/2$ | ......... | ......... | ......... |
| ......... | $W_3^{\{1234\}}/2$ | ......... | ......... | ......... |
| ......... | $W_4^{\{1234\}}/2$ | ......... | ......... | ......... |
| ......... | $W_6^{\{1234\}}/2$ | ......... | ......... | ......... |
| ......... | $W_8^{\{1234\}}/2$ | ......... | ......... | ......... |
| ......... | $W_9^{\{1234\}}/2$ | ......... | ......... | ......... |
| ......... | $W_{15}^{\{1234\}}/2$ | ......... | ......... | ......... |

It can be seen from Table 3 that, the network device selects some precoding matrixes from a column of precoding matrixes whose quantities of layers are 4 in the CSI feedback precoding matrix codebook shown in Table 1 and adds the precoding matrixes to the first precoding matrix codebook as precoding matrixes corresponding to the quantity of ports being 4.

In this embodiment of the present invention, when processing each CSI feedback precoding matrix codebook, the network device may perform processing in a same manner, that is, may select all precoding matrixes with a particular quantity of layers from the CSI feedback precoding matrix codebooks and add all the precoding matrixes with a particular quantity of layers to the first precoding matrix; or may select some precoding matrixes with a particular quantity of layers from the CSI feedback precoding matrix codebooks and add the precoding matrixes with a particular quantity of layers to the first precoding matrix; or may perform processing in different manners, that is, for some CSI feedback precoding matrix codebooks, may select all precoding matrixes with a particular quantity of layers from the CSI feedback precoding matrix codebooks and add all the precoding matrixes with a particular quantity of layers to the first precoding matrix, and for some other CSI feedback precoding matrix codebooks, may select some precoding matrixes with a particular quantity of layers from the CSI feedback precoding matrix codebooks and add the precoding matrixes with a particular quantity of layers to the first precoding matrix. A specific processing manner is not limited in this embodiment of the present invention.

Step 102: The network device precodes a CSI-RS according to the first precoding matrix.

After selecting the first precoding matrix, the network device encodes the CSI-RS according to the first precoding matrix, to obtain a precoded CSI-RS.

In this embodiment of the present invention, the precoded CSI-RS is also a CSI-RS actually.

Step 103: The network device sends the precoded CSI-RS to user equipment.

After precoding the CSI-RS and obtaining the precoded CSI-RS, the network device may send the precoded CSI-RS to the user equipment.

In this embodiment of the present invention, when sending the precoded CSI-RS to the user equipment, the network device may together send a PMI (Precoding Matrix Indicator, precoding matrix indicator) corresponding to the first precoding matrix to the user equipment, or the network device may send a PMI corresponding to the first precoding matrix to the user equipment in another occasion, or the user equipment may obtain a PMI corresponding to the first precoding matrix in another manner, which is not limited in the present invention.

Optionally, in this embodiment of the present invention, the method may further include:

receiving, by the network device, a feedback message of the user equipment for the first precoding matrix; and if the feedback message indicates that a PMI corresponding to the first precoding matrix is not an available PMI of the CSI-RS, reobtaining, by the network device, the first precoding matrix; if the feedback message indicates that a PMI corresponding to the first precoding matrix is an available PMI of the CSI-RS, precoding, by the network device, the CSI-RS still according to the first precoding matrix, and sending the precoded CSI-RS to the user equipment.

In this embodiment of the present invention, after receiving the precoded CSI-RS, the user equipment compares a parameter of the precoded CSI-RS with a preset parameter threshold, to generate a comparison result, and generates, according to the comparison result, the feedback message used to be sent to the network device.

If the feedback message indicates that the PMI corresponding to the first precoding matrix is not an available PMI of the CSI-RS, the network device reobtains a first precoding matrix from the first precoding matrix codebook, and precodes the CSI-RS again according to the reobtained first precoding matrix. Then, the network device sends the CSI-RS that is precoded again to the user equipment. Similarly, the user equipment compares a parameter of the CSI-RS that is precoded again with the preset parameter threshold, to obtain a comparison result, and generates, according to the comparison result, a feedback message that is used to be sent to the network device. Similarly, after receiving the feedback message, the network device determines, in a same manner as before, according to the feedback message, whether a PMI corresponding to a reselected first precoding matrix is an available PMI of the CSI-RS. If the PMI corresponding to the reobtained first precoding matrix is used as an available PMI of the CSI-RS, the network device subsequently precodes the CSI-RS by still using the reobtained first precoding matrix. If the PMI corresponding to the reobtained first precoding matrix is still not an available PMI of the CSI-RS, the network device reselects a first precoding matrix from the first precoding matrix codebook to precode the CSI-RS. Circulation is performed in such a manner, and the circulation process ends until a first precoding matrix whose PMI can be used as an available PMI of the CSI-RS is selected.

In this embodiment of the present invention, step 103 may be a step for finally ending a circulation, that is, before step 103, the method may further include at least one circulation process of selecting an available PMI of the CSI-RS. However, in these circulation processes, no available PMI of the CSI-RS is selected each time. Certainly, before step 103, there may be no circulation process, that is, the network device selects an available PMI of the CSI-RS at one time.

In this embodiment of the present invention, an available PMI refers to that the user equipment determines that a first precoding matrix corresponding to the PMI may be used as a precoding matrix for precoding the CSI-RS. That is, if the user equipment determines by means of comparison that a relationship between the parameter of the precoded CSI-RS and the preset parameter threshold meets a preset condition, the user equipment considers that the first precoding matrix corresponding to the received PMI may be used as a precoding matrix for precoding the CSI-RS. In this embodiment of the present invention, such a type of PMIs are referred to as available PMIs, or may be referred to as candidate PMIs.

For example, if the parameter of the precoded CSI-RS is a power parameter, the preset parameter threshold is a preset power threshold. Moreover, if power of the precoded CSI-RS is greater than or equal to the preset power threshold, a comparison result obtained by the user equipment is that the PMI corresponding to the first precoding matrix is a candidate PMI of the CSI-RS, that is, for the user equipment, after the CSI-RS is precoded by using the first precoding matrix, if power of the received precoded CSI-RS is relatively high, the CSI-RS may be precoded by still using the first precoding matrix. Therefore, for the user equipment, the network device may precode the CSI-RS by still using the first precoding matrix. A circulation process of selecting a first precoding matrix for the user equipment may be ended.

For example, if the parameter of the precoded CSI-RS is a power parameter, the preset parameter threshold is a preset power threshold. Moreover, if power of the precoded CSI-RS is less than the preset power threshold, a comparison result obtained by the user equipment is that the PMI corresponding to the first precoding matrix cannot be used as a candidate PMI of the CSI-RS, that is, for the user equipment, after the CSI-RS is precoded by using the first precoding matrix, if power of the received precoded CSI-RS is relatively low, it may be considered that a sending direction of the precoded CSI-RS obtained after beamforming is deviated from a direction of the user equipment. Therefore, the first precoding matrix cannot be still used to precode the CSI-RS. Instead, another first precoding matrix should be selected to precode the CSI-RS, so as to enable the sending direction of the precoded CSI-RS to be aligned with the direction of the user equipment as far as possible, improve power of a received signal, and reduce a loss of power in an environment.

Therefore, for the user equipment, the network device may determine that the first precoding matrix is not used any more to precode the CSI-RS, and reselect another first precoding matrix from the first precoding matrix codebook until an available PMI is selected for the CSI-RS.

Optionally, in this embodiment of the present invention, the sending, by the network device, the precoded CSI-RS to user equipment includes:

sending, by the network device, the precoded CSI-RS to the user equipment by using a PDCCH (Physical Downlink Control Channel, physical downlink control channel) or an EPDCCH (Enhanced Physical Downlink Control Channel, enhanced physical downlink control channel).

Optionally, in this embodiment of the present invention, the receiving, by the network device, a feedback message of the user equipment for the first precoding matrix includes:

receiving, by the network device, the feedback message of the user equipment for the first precoding matrix by using a PUCCH (Physical Uplink Control Channel, physical uplink control channel), an EPUCCH (Enhanced Physical Uplink Control Channel, enhanced physical uplink control channel), or a PUSCH (Physical Uplink Shared Channel, physical uplink shared channel).

Optionally, in this embodiment of the present invention, if the feedback message indicates that the PMI corresponding to the first precoding matrix is an available PMI of the CSI-RS, the feedback message includes the PMI or acknowledgement information that is used to indicate that the PMI is an available PMI of the CSI-RS; or if the feedback message indicates that the PMI corresponding to the first precoding matrix is not an available PMI of the CSI-RS, the feedback message includes indication information of reobtaining the first precoding matrix or acknowledgement information that is used to indicate that the PMI is not an available PMI of the CSI-RS.

Optionally, when sending the feedback message to the network device, the user equipment may directly add, when a PMI corresponding to a first precoding matrix may be used as an available PMI of the user equipment, the PMI to the feedback message and send the feedback message to the network device, or may directly add, when a PMI corresponding to a first precoding matrix cannot be used as an available PMI of the user equipment, adjustment information (for example, indication information of reobtaining the first precoding matrix) of the PMI to the feedback message and send the feedback message to the network device. The PMI or the adjustment information of the PMI is directly sent to the network device, so that a result can be relatively intuitively displayed to the network device, thereby reducing determining work required by the network device.

Alternatively, when sending the feedback message to the network device, the user equipment may add corresponding acknowledgement information to the feedback message according to a determining result of the user equipment, and send the feedback message to the network device. For example, if the user equipment determines that a PMI corresponding to a first precoding matrix may be used as an available PMI of the user equipment, the acknowledgement information added by the user equipment to the feedback message indicates that the PMI may be used as an available PMI of the user equipment. If the user equipment determines that a PMI corresponding to a first precoding matrix cannot be used as an available PMI of the user equipment, the acknowledgement information added by the user equipment to the feedback message indicates that the PMI cannot be used as an available PMI of the user equipment. The acknowledgement information is sent to the network device. The acknowledgement information generally has a relatively small capacity. For example, one piece of acknowledgement information is of only one bit (for example, when the acknowledgement information is "1", it indicates that a PMI may be used as an available PMI of the user equipment; when the acknowledgement information is "0", it indicates that a PMI cannot be used as an available PMI of the user equipment), thereby reducing a volume of data that needs to be transmitted and improving a transmission rate.

There may be multiple user equipments in one cell. A same processing process may be performed for each user equipment. Therefore, a proper precoding matrix for beamforming can be selected for each user equipment. Improving power of a CSI-RS received by each user equipment as far as possible is reducing transmit power consumed in an environment as far as possible, thereby improving utilization of transmit power. In addition, similar processing is also performed for each user equipment, it can be ensured as far as possible that each user equipment can normally receive a CSI-RS, thereby improving coverage of a CSI-RS.

Based on a same invention idea, an embodiment of the present invention provides another CSI-RS transmission method. The method may be applied to user equipment. The user equipment in this embodiment of the present invention and the user equipment in FIG. 1 may be a same device. Similarly, a network device in this embodiment of the present invention and the network device in FIG. 1 may also be a same device. A main process of the method is:

receiving, by the user equipment, a precoded CSI-RS sent by the network device, where the precoded CSI-RS is obtained after the network device precodes a CSI-RS according to an obtained first precoding matrix.

A manner of obtaining, by the network device, the precoded CSI-RS according to the obtained first precoding matrix and the CSI-RS is already described in the process in FIG. 1, and details are not described herein again.

Optionally, in this embodiment of the present invention, the network device may send the precoded CSI-RS to the user equipment by using a PDCCH or an EPDCCH.

Optionally, in this embodiment of the present invention, the method may further include:

sending, by the user equipment, a feedback message for the first precoding matrix to the network device.

Optionally, in this embodiment of the present invention, the method may further include:

comparing, by the user equipment, a parameter of the precoded CSI-RS with a preset parameter threshold, and generating the feedback message for the first precoding matrix according to a comparison result.

Optionally, in this embodiment of the present invention, the comparing, by the user equipment, a parameter of the precoded CSI-RS with a preset parameter threshold, and generating the feedback message for the first precoding matrix according to a comparison result includes:

comparing, by the user equipment, the parameter of the precoded CSI-RS with the preset parameter threshold; and if a relationship between the parameter of the precoded CSI-RS and the preset parameter threshold meets a preset condition, determining that the comparison result is that a PMI corresponding to the first precoding matrix is an available PMI of the CSI-RS, and generating the feedback message for the first precoding matrix according to the comparison result; or comparing, by the user equipment, the parameter of the precoded CSI-RS with the preset parameter threshold; and if a relationship between the parameter of the precoded CSI-RS and the preset parameter threshold does not meet a preset condition, determining that the comparison result is that a PMI corresponding to the first precoding matrix is not an available PMI of the CSI-RS, and generating the feedback message for the first precoding matrix according to the comparison result.

In this embodiment of the present invention, the parameter may include one or more of a power parameter, a signal-to-noise ratio parameter, an interference signal power parameter, or any other possible parameter.

For example, if the parameter includes a power parameter, the preset parameter threshold may be specifically a preset power threshold. Therefore, the preset condition may be: Power of the precoded CSI-RS is greater than or equal to the preset power threshold. That is, if the user equipment determines by means of comparison that the power of the precoded CSI-RS is greater than or equal to the preset power threshold, the user equipment determines that the power of the precoded CSI-RS meets the preset condition. if the user equipment determines by means of comparison that the power of the precoded CSI-RS is not greater than the preset power threshold, if the user equipment determines by means of comparison that the power of the precoded CSI-RS is less than the preset power threshold, the user equipment determines that the power of the precoded CSI-RS does not meet the preset condition.

For example, if the parameter includes a signal-to-noise ratio parameter, the preset parameter threshold may be specifically a preset signal-to-noise ratio threshold. Therefore, the preset condition may be: A signal-to-noise ratio of the precoded CSI-RS is greater than or equal to the preset signal-to-noise ratio threshold. That is, if the user equipment determines by means of comparison that the signal-to-noise ratio of the precoded CSI-RS is greater than or equal to the preset signal-to-noise ratio threshold, the user equipment determines that the signal-to-noise ratio of the precoded CSI-RS meets the preset condition. Otherwise, if the user equipment determines by means of comparison that the signal-to-noise ratio of the precoded CSI-RS is less than the preset signal-to-noise ratio threshold, the user equipment determines that the signal-to-noise ratio of the precoded CSI-RS does not meet the preset condition.

For example, if the parameter includes an interference signal power parameter, the preset parameter threshold may be specifically a preset interference signal power threshold. Therefore, the preset condition may be: An interference signal power of the precoded CSI-RS is less than the preset interference signal power threshold. That is, if the user equipment determines by means of comparison that the interference signal power of the precoded CSI-RS is less than the preset interference signal power threshold, the user equipment determines that the interference signal power of the precoded CSI-RS meets the preset condition. Otherwise, if the user equipment determines by means of comparison that the interference signal power of the precoded CSI-RS is greater than or equal to the preset interference signal power threshold, the user equipment determines that the interference signal power of the precoded CSI-RS does not meet the preset condition.

Certainly, the parameter may further include another parameter, and the preset condition may also be different according to different specific parameters.

For example, if the parameter includes a power parameter, the preset parameter threshold is specifically the preset power threshold. If power of the precoded CSI-RS is greater than or equal to the preset power threshold, a comparison result obtained by the user equipment is that a PMI corresponding to the first precoding matrix is an available PMI of the CSI-RS, that is, for the user equipment, after the CSI-RS is precoded by using the first precoding matrix, if power of the received precoded CSI-RS is relatively high, the CSI-RS may be precoded by still using the first precoding matrix. Therefore, for the user equipment, the network device may precode the CSI-RS by still using the first precoding matrix.

For example, if the parameter includes a power parameter, the preset parameter threshold is specifically the preset power threshold. If power of the precoded CSI-RS is less than the preset power threshold, a comparison result obtained by the user equipment is that a PMI corresponding to the first precoding matrix cannot be used as an available PMI of the CSI-RS, that is, for the user equipment, after the CSI-RS is precoded by using the first precoding matrix, if power of the received precoded CSI-RS is relatively low, it may be considered that a sending direction of the precoded CSI-RS obtained after beamforming is deviated from a direction of the user equipment. Therefore, the CSI-RS cannot be precoded by still using the first precoding matrix. Instead, another first precoding matrix should be selected to precode the CSI-RS, so as to enable the sending direction of the precoded CSI-RS to be aligned with the direction of the user equipment as far as possible, improve power of a received signal, and reduce a loss of power in an environment.

Optionally, in this embodiment of the present invention, after the generating the feedback message for the first precoding matrix according to a comparison result, the method may further include:

sending, by the user equipment, the feedback message for the precoded CSI-RS to the network device.

Optionally, in this embodiment of the present invention, if the feedback message indicates that the PMI corresponding to the first precoding matrix is an available PMI of the CSI-RS, the feedback message includes the PMI or acknowledgement information that is used to indicate that the PMI is an available PMI of the CSI-RS; or if the feedback message indicates that the precoding matrix indicator PMI corresponding to the first precoding matrix is not an available PMI of the CSI-RS, the feedback message includes indication information of reobtaining the first precoding matrix or acknowledgement information that is used to indicate that the PMI is not an available PMI of the CSI-RS.

The process in FIG. 1 describes that, if the feedback message sent by the user equipment indicates that a PMI corresponding to a first precoding matrix is not an available PMI of the user equipment, the network device reselects a first precoding matrix to precode the CSI-RS for the user equipment, and sends the CSI-RS that is precoded again to the user equipment. Circulation is constantly performed in such a manner, and the circulation ends until a feedback message sent by the user equipment indicates that a PMI corresponding to a first precoding matrix may be used as an available PMI of the user equipment.

Certainly, if a channel fading situation of the user equipment changes, the network device may reselect a precoding matrix for the CSI-RS for the user equipment until an available PMI meeting the preset condition is determined. For the user equipment, corresponding beamforming is performed on the CSI-RS by using a precoding matrix corresponding to the available PMI, so as to achieve an objective of improving system performance.

In this embodiment of the present invention, for a disadvantage that a CSI-RS is transmitted in all directions at a high frequency, utilization of transmit power is improved by using a method for performing beamforming on a transmit end. Moreover, beamforming can greatly improve coverage of the CSI-RS, thereby improving a data throughput and performance of an entire system, which can play a critical role in improving data transmission performance of a control-layer plane and a data plane.

Figure 2:
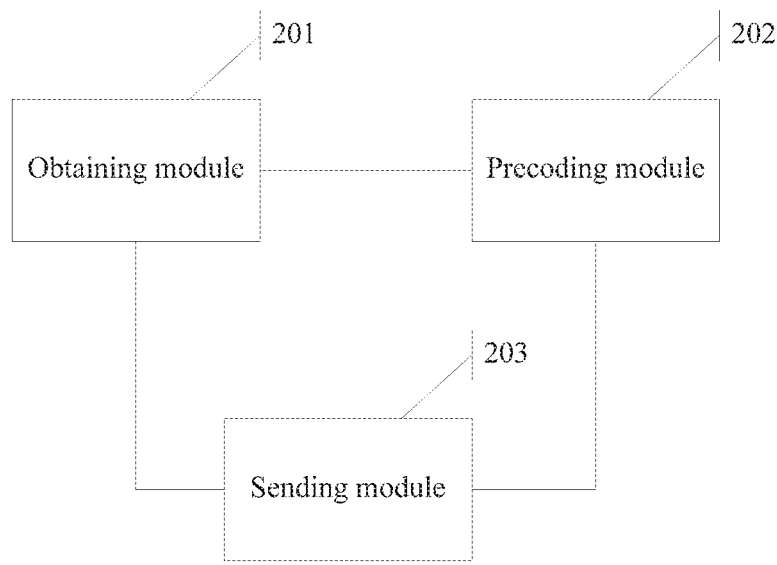
FIG. 2 is a main structural block diagram of a network device according to an embodiment of the present invention.

Referring to FIG. 2, based on a same invention idea, an embodiment of the present invention provides a network device, including an obtaining module 201, a precoding module 202, and a sending module 203.

The obtaining module 201 is configured to obtain a first precoding matrix.

The precoding module 202 is configured to precode a CSI-RS according to the first precoding matrix.

The sending module 203 is configured to send the precoded CSI-RS to user equipment.

Optionally, in this embodiment of the present invention, the obtaining module 201 is specifically configured to:

determine a quantity of ports used to send the CSI-RS to the user equipment; and select a precoding matrix corresponding to the determined quantity of ports from a first precoding matrix codebook as the first precoding matrix.

Optionally, in this embodiment of the present invention, the obtaining module 201 is further configured to: before selecting the precoding matrix corresponding to the quantity of ports from the first precoding matrix codebook as the first precoding matrix, select a precoding matrix from M CSI feedback precoding matrix codebooks, and constitute the first precoding matrix codebook by using the selected precoding matrix, where the first precoding matrix codebook includes a precoding matrix corresponding to at least two ports, and M is a positive integer.

Optionally, in this embodiment of the present invention, that the obtaining module 201 is further configured to select a precoding matrix from M CSI feedback precoding matrix codebooks, and constitute the first precoding matrix codebook by using the selected precoding matrix is specifically: select a precoding matrix whose quantity of layers is equal to the determined quantity of ports from an $i^{th}$ CSI feedback precoding matrix codebook, where i is a positive integer, and $1 < i \le M$; and add the selected precoding matrix to the first precoding matrix codebook.

Figure 3:
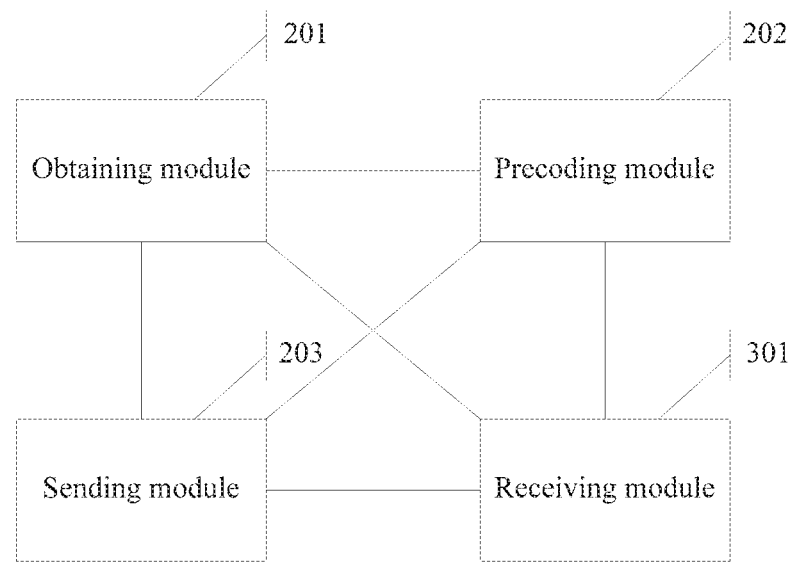
FIG. 3 is a structural block diagram of a network device further including a receiving module according to an embodiment of the present invention.

Optionally, in this embodiment of the present invention, referring to FIG. 3, the network device further includes a receiving module 301.

The receiving module 301 is configured to receive a feedback message of the user equipment for the first precoding matrix.

The obtaining module 201 is further configured to: if the feedback message indicates that a PMI corresponding to the first precoding matrix is not an available PMI of the CSI-RS, reobtain the first precoding matrix.

The precoding module 202 is further configured to: if the feedback message indicates that a PMI corresponding to the first precoding matrix is not an available PMI of the CSI-RS, precode the CSI-RS still according to the first precoding matrix. The sending module 203 is further configured to send the precoded CSI-RS to the user equipment.

Optionally, in this embodiment of the present invention, the receiving module 301 is specifically configured to receive the feedback message of the user equipment for the first precoding matrix by using a PUCCH, an EPUCCH, or a PUSCH.

Optionally, in this embodiment of the present invention, the sending module 203 is specifically configured to send the precoded CSI-RS to the user equipment by using a PDCCH or an EPDCCH.

Based on a same invention idea, an embodiment of the present invention provides user equipment. The user equipment includes a receiving module. The receiving module is configured to receive a precoded CSI-RS sent by a network device, where the precoded CSI-RS is obtained after the network device precodes a CSI-RS according to an obtained first precoding matrix.

Optionally, in this embodiment of the present invention, the user equipment further includes a sending module, configured to send a feedback message for the first precoding matrix to the network device.

Optionally, in this embodiment of the present invention, the user equipment further includes a comparison module, configured to compare a parameter of the precoded CSI-RS with a preset parameter threshold, and generate the feedback message for the first precoding matrix according to a comparison result.

Optionally, in this embodiment of the present invention, the comparison module is specifically configured to:

compare the parameter of the precoded CSI-RS with the preset parameter threshold; and if a relationship between the parameter of the precoded CSI-RS and the preset parameter threshold meets a preset condition, determine that the comparison result is that a PMI corresponding to the first precoding matrix is an available PMI of the CSI-RS, and generate the feedback message for the first precoding matrix according to the comparison result; or compare the parameter of the precoded CSI-RS with the preset parameter threshold; and if a relationship between the parameter of the precoded CSI-RS and the preset parameter threshold does not meet a preset condition, determine that the comparison result is that a PMI corresponding to the first precoding matrix is not an available PMI of the CSI-RS, and generate the feedback message for the first precoding matrix according to the comparison result.

Figure 4:
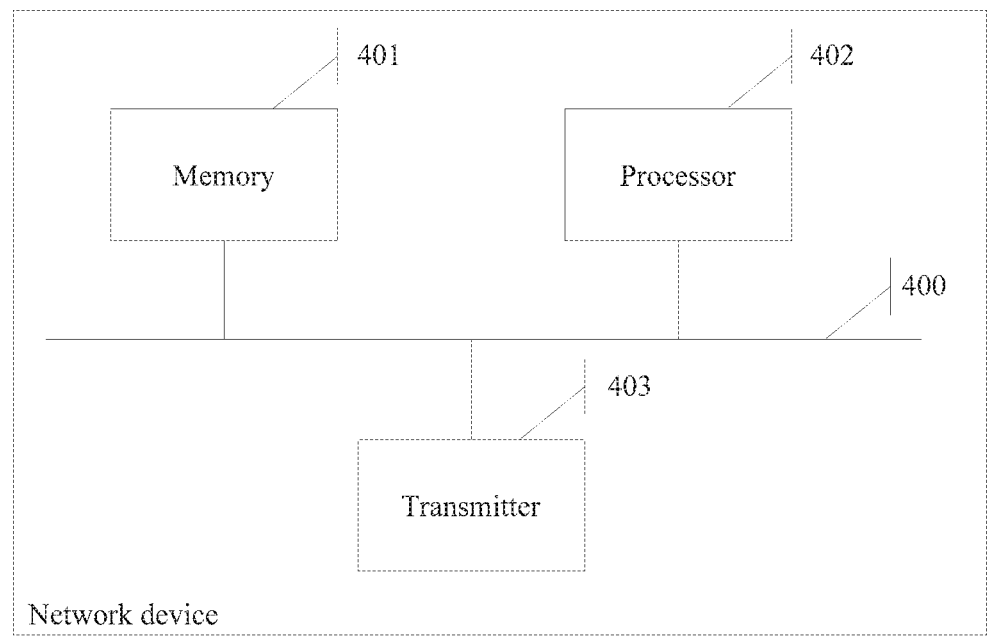
FIG. 4 is a main schematic structural diagram of a network device according to an embodiment of the present invention.

Referring to FIG. 4, based on a same invention idea, an embodiment of the present invention provides a network device. The network device may include a memory 401, a processor 402, and a transmitter 403 that are connected to a same bus 400.

The memory 401 is configured to store an instruction required by the processor 402 to perform a task.

The processor 402 is configured to execute the instruction stored in the memory 401: obtaining a first precoding matrix, and precoding a CSI-RS according to the first precoding matrix.

The transmitter 403 is configured to send the precoded CSI-RS to user equipment.

Optionally, in this embodiment of the present invention, that the processor 402 is specifically configured to obtain a first precoding matrix is specifically:

determine the quantity of ports used to send the CSI-RS to the user equipment; and select a precoding matrix corresponding to the determined quantity of ports from a first precoding matrix codebook as the first precoding matrix.

Optionally, in this embodiment of the present invention, the processor 402 is further configured to execute the instruction: before selecting the precoding matrix corresponding to the quantity of ports from the first precoding matrix codebook as the first precoding matrix, selecting a precoding matrix from M CSI feedback precoding matrix codebooks, and constituting the first precoding matrix codebook by using the selected precoding matrix, where the first precoding matrix codebook includes a precoding matrix corresponding to at least two ports, and M is a positive integer.

Optionally, in this embodiment of the present invention, that the processor 402 is further configured to select a precoding matrix from M CSI feedback precoding matrix codebooks, and constitute the first precoding matrix codebook by using the selected precoding matrix is specifically:

select a precoding matrix whose quantity of layers is equal to the determined quantity of ports from an $i^{th}$ CSI feedback precoding matrix codebook, where i is a positive integer, and $1 < i \le M$; and add the selected precoding matrix to the first precoding matrix codebook.

Figure 5:
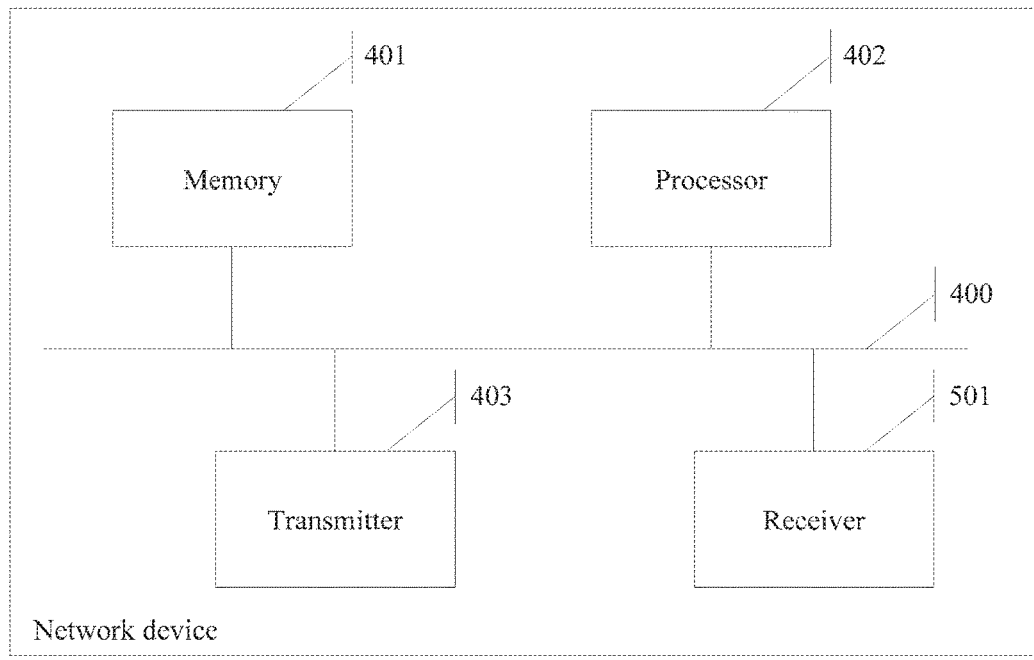
FIG. 5 is a schematic structural diagram of a network device further including a receiver according to an embodiment of the present invention.

Optionally, in this embodiment of the present invention, referring to FIG. 5, the network device further includes a receiver 501 connected to the bus 400, where the receiver 501 is configured to receive a feedback message of the user equipment for the first precoding matrix; and the processor 402 is further configured to: if the feedback message indicates that a precoding matrix indicator PMI corresponding to the first precoding matrix is not an available PMI of the CSI-RS, reobtain the first precoding matrix; if the feedback message indicates that a precoding matrix indicator PMI corresponding to the first precoding matrix is an available PMI of the CSI-RS, precode the CSI-RS still according to the first precoding matrix, and send the precoded CSI-RS to the user equipment by using the transmitter 403.

Optionally, in this embodiment of the present invention, the receiver 501 is specifically configured to receive the feedback message of the user equipment for the first precoding matrix by using a PUCCH, an EPUCCH, or a PUSCH.

Optionally, in this embodiment of the present invention, the transmitter 403 is specifically configured to send the precoded CSI-RS to the user equipment by using a PDCCH or an EPDCCH.

Figure 6:
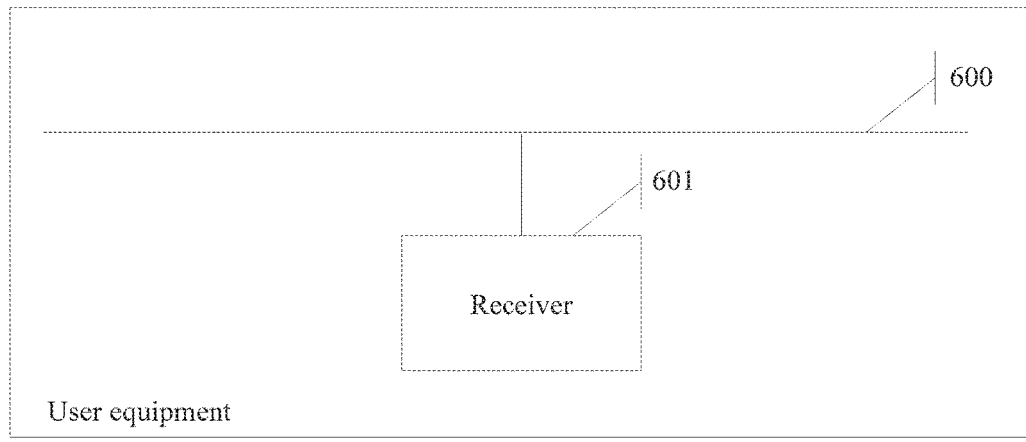
FIG. 6 is a main schematic structural diagram of user equipment according to an embodiment of the present invention.

Referring to FIG. 6, based on a same invention idea, an embodiment of the present invention provides user equipment, including a receiver 601 connected to a bus 600. The receiver 601 is configured to receive a precoded CSI-RS sent by a network device, where the precoded CSI-RS is obtained after the network device precodes a CSI-RS according to an obtained first precoding matrix.

Figure 7:
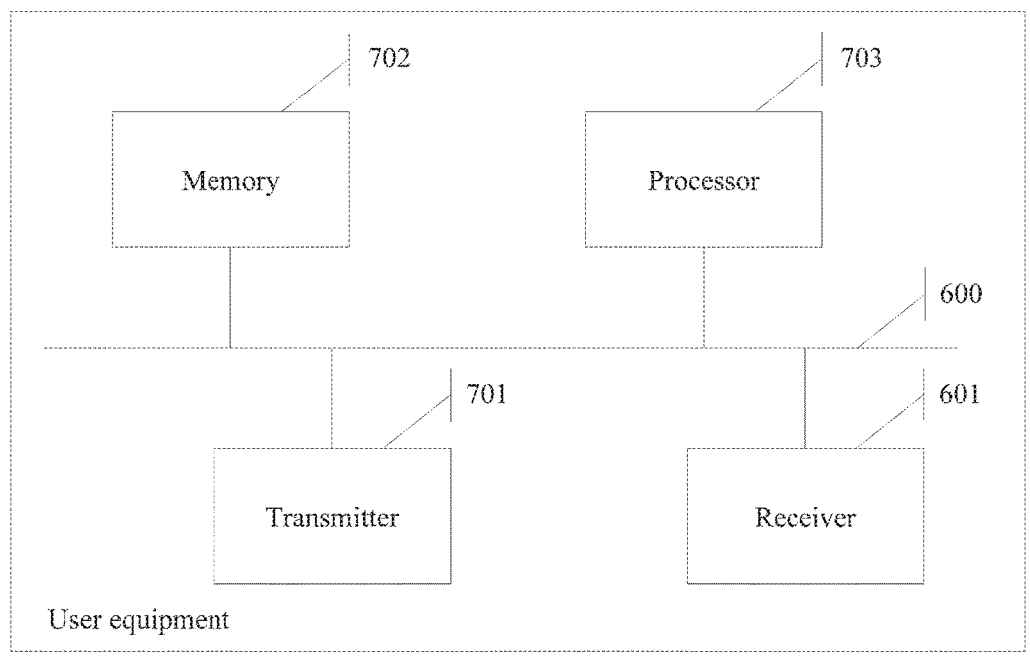
FIG. 7 is a schematic structural diagram of user equipment further including a memory, a processor, and a transmitter according to an embodiment of the present invention.

Optionally, referring to FIG. 7, the user equipment further includes a transmitter 701 connected to the bus 600, configured to send a feedback message for the first precoding matrix to the network device.

Optionally, still referring to FIG. 7, the user equipment further includes a memory 702 and a processor 703 that are connected to the bus 600, where the memory 702 is configured to store an instruction; and the processor 703 is configured to execute the instruction: comparing a parameter of the precoded CSI-RS with a preset parameter threshold, and generating the feedback message for the first precoding matrix according to a comparison result.

Optionally, in this embodiment of the present invention, the processor 703 is specifically configured to:

execute the instruction: comparing the parameter of the precoded CSI-RS with the preset parameter threshold; and if a relationship between the parameter of the precoded CSI-RS and the preset parameter threshold meets a preset condition, determining that the comparison result is that a precoding matrix indicator PMI corresponding to the first precoding matrix is an available PMI of the CSI-RS, and generating the feedback message for the first precoding matrix according to the comparison result; or execute the instruction: comparing the parameter of the precoded CSI-RS with the preset parameter threshold; and if a relationship between the parameter of the precoded CSI-RS and the preset parameter threshold does not meet a preset condition, determining that the comparison result is that a PMI corresponding to the first precoding matrix is not an available PMI of the CSI-RS, and generating the feedback message for the first precoding matrix according to the comparison result.

The embodiments of the present invention provide a CSI-RS transmission method. The method includes: obtaining, by a network device, a first precoding matrix; precoding, by the network device, a CSI-RS according to the first precoding matrix; and sending, by the network device, the precoded CSI-RS to user equipment.

In the embodiments of the present invention, when a network device is to transmit a CSI-RS to user equipment, the network device first needs to precode the CSI-RS according to an obtained precoding matrix, which is equivalent to that beamforming is performed on the CSI-RS, and sends the precoded CSI-RS to the user equipment. In this way, after receiving the precoded CSI-RS, the user equipment may compare a parameter of the precoded CSI-RS with a preset parameter threshold. For example, if a relationship between the parameter of the precoded CSI-RS and the preset parameter threshold meets a preset condition, the user equipment determines that power of the received signal is relatively high, and less power is wasted, which is equivalent to that, after beamforming is performed on the CSI-RS, a transmission direction of the precoded CSI-RS is basically aligned with the user equipment. Therefore, the precoded CSI-RS received by the user equipment has relatively high power, and the user equipment determines that the CSI-RS may be precoded by still using the precoding matrix. However, if a relationship between the parameter of the precoded CSI-RS and the preset parameter threshold does not meet a preset condition, the user equipment determines that power of the received signal is relatively low, and more power is wasted, which is equivalent to that, after beamforming is performed on the CSI-RS, a transmission direction of the precoded CSI-RS is not aligned with the user equipment. Therefore, the precoded CSI-RS received by the user equipment has relatively low power, and the user equipment determines that the CSI-RS may be not precoded by still using the precoding matrix. Therefore, the network device redetermines a precoding manner for the CSI-RS, for example, precodes the CSI-RS by reselecting a precoding matrix, and then sends the CSI-RS that is precoded again to the user equipment for performing determining, until a proper precoding matrix is selected for the user equipment.

In the embodiments of the present invention, a method for performing beamforming on a transmit end is used, to improve utilization of transmit power. Beamforming can greatly enlarge effective coverage of a CSI-RS, that is, the CSI-RS is transmitted to each user equipment as far as possible, thereby improving a data throughput and performance of an entire system. This plays a critical role in improving data transmission performance of a control-layer plane and a data plane.

It may be clearly understood by a person skilled in the art that, for the purpose of convenient and brief description, division of the foregoing function units is used as an example for illustration. In an actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in another manner. For example, the described apparatus embodiment is merely exemplary. For example, unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may be not physically separated, and parts displayed as units may be or may be not physical units, that is, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe in detail the technical solutions of this application. The descriptions of the foregoing embodiments are merely intended to help understand the method and a core idea of the present invention, and shall not be construed as a limitation to the present invention. Any variation or replacement readily figured out by a person skilled in the art within the technical scope disclosed in the present invention shall fall within the protection scope of the present invention.

What is claimed is:

1. A channel state indication reference signal (CSI-RS) transmission method, comprising:
    obtaining, by a network device, a first precoding matrix;
    precoding, by the network device, a CSI-RS according to the first precoding matrix;
    sending, by the network device, the precoded CSI-RS to user equipment;
    wherein obtaining, by a network device, a first precoding matrix comprises:
        determining, by the network device, a quantity of ports used to send the CSI-RS to the user equipment, and
        selecting, by the network device, a precoding matrix corresponding to the determined quantity of ports from a first precoding matrix codebook as the first precoding matrix; and
    wherein before selecting, by the network device, the precoding matrix corresponding to the quantity of ports from the first precoding matrix codebook as the first precoding matrix, the method further comprises:
        selecting, by the network device, a precoding matrix from M CSI feedback precoding matrix codebooks, and constituting the first precoding matrix codebook by using the selected precoding matrix, wherein the first precoding matrix codebook comprises a precoding matrix corresponding to at least two ports, and M is a positive integer.

2. The method according to claim 1, wherein selecting, by the network device, the precoding matrix from M CSI feedback precoding matrix codebooks, and constituting the first precoding matrix codebook by using the selected precoding matrix comprises:
    selecting, by the network device, a precoding matrix whose quantity of layers is equal to the determined quantity of ports from an $i^{th}$ CSI feedback precoding matrix codebook, wherein i is a positive integer, and $1<i\leq M$; and
    adding, by the network device, the selected precoding matrix to the first precoding matrix codebook.

3. A channel state indication reference signal (CSI-RS) transmission method, comprising:
    obtaining, by a network device, a first precoding matrix;
    precoding, by the network device, a CSI-RS according to the first precoding matrix;
    sending, by the network device, the precoded CSI-RS to user equipment;
    receiving, by the network device, a feedback message of the user equipment for the first precoding matrix; and
    when the feedback message indicates that a precoding matrix indicator (PMI) corresponding to the first precoding matrix is not an available PMI of the CSI-RS, reobtaining, by the network device, a first precoding matrix, and when a PMI corresponding to the first precoding matrix is an available PMI of the CSI-RS, precoding, by the network device, the CSI-RS still according to the first precoding matrix, and sending the precoded CSI-RS to the user equipment.

4. The method according to claim 3, wherein receiving, by the network device, the feedback message of the user equipment for the first precoding matrix comprises:
    receiving, by the network device, the feedback message of the user equipment for the first precoding matrix by using a physical uplink control channel (PUCCH), an enhanced physical uplink control channel (EPUCCH), or a physical uplink shared channel (PUSCH).

5. The method according to claim 3, wherein:
    when the feedback message indicates that the PMI corresponding to the first precoding matrix is an available PMI of the CSI-RS, the feedback message comprises the PMI or acknowledgement information for indicating that the PMI is an available PMI of the CSI-RS; and
    when the feedback message indicates that the PMI corresponding to the first precoding matrix is not an available PMI of the CSI-RS, the feedback message comprises indication information of reobtaining the first precoding matrix or acknowledgement information for indicating that the PMI is not an available PMI of the CSI-RS.

6. A channel state indication reference signal (CSI-RS) transmission method, comprising:
    receiving, by user equipment, a precoded CSI-RS sent by a network device, wherein the precoded CSI-RS is obtained after the network device precodes a CSI-RS according to an obtained first precoding matrix;
    comparing, by the user equipment, a parameter of the precoded CSI-RS with a preset parameter threshold, and:
        when a relationship between the parameter of the precoded CSI-RS and the preset parameter threshold meets a preset condition, determining that a comparison result is that a precoding matrix indicator (PMI) corresponding to the first precoding matrix is an available PMI of the CSI-RS, and generating a feedback message for the first precoding matrix according to the comparison result, and when a relationship between the parameter of the precoded CSI-RS and the preset parameter threshold does not meet a preset condition, determining that the comparison result is that a PMI corresponding to the first precoding matrix is not an available PMI of the CSI-RS, and generating the feedback message for the first precoding matrix according to the comparison result; and sending, by the user equipment, the feedback message for the first precoding matrix to the network device.

7. The method according to claim 6, wherein:
when the feedback message indicates that the PMI corresponding to the first precoding matrix is an available PMI of the CSI-RS, the feedback message comprises the PMI or acknowledgement information for indicating that the PMI is an available PMI of the CSI-RS; and
when the feedback message indicates that the PMI corresponding to the first precoding matrix is not an available PMI of the CSI-RS, the feedback message comprises indication information of reobtaining the first precoding matrix or acknowledgement information for indicating that the PMI is not an available PMI of the CSI-RS.

8. A computer program product comprising a non-transitory computer-readable medium storing computer executable instructions which, when executed by one or more processors, cause a network device to:
obtain a first precoding matrix;
precode a CSI-RS according to the first precoding matrix;
send the precoded CSI-RS to user equipment;
wherein to obtain the first precoding matrix, the computer executable instructions, when executed by the one or more processors, cause the network device to:
determine a quantity of ports used to send the CSI-RS to the user equipment; and
select a precoding matrix corresponding to the determined quantity of ports from a first precoding matrix codebook as the first precoding matrix; and
before selecting the precoding matrix corresponding to the quantity of ports from the first precoding matrix codebook as the first precoding matrix, select a precoding matrix from M CSI feedback precoding matrix codebooks, and constitute the first precoding matrix codebook by using the selected precoding matrix, wherein the first precoding matrix codebook comprises a precoding matrix corresponding to at least two ports, and M is a positive integer.

9. A computer program product comprising a non-transitory computer-readable medium storing computer executable instructions which, when executed by one or more processors, cause user equipment to:
receive a precoded CSI-RS sent by a network device, wherein the precoded CSI-RS is obtained after the network device precodes a CSI-RS according to an obtained first precoding matrix;
compare a parameter of the precoded CSI-RS with a preset parameter threshold, and:
when a relationship between the parameter of the precoded CSI-RS and the preset parameter threshold meets a preset condition, determine that a comparison result is that a precoding matrix indicator (PMI) corresponding to the first precoding matrix is an available PMI of the CSI-RS, and generate a feedback message for the first precoding matrix according to the comparison result, and when a relationship between the parameter of the precoded CSI-RS and the preset parameter threshold does not meet a preset condition, determine that the comparison result is that a PMI corresponding to the first precoding matrix is not an available PMI of the CSI-RS, and generate the feedback message for the first precoding matrix according to the comparison result; and send the feedback message for the first precoding matrix to the network device.

10. A network device, comprising:
a processor;
a memory coupled to the processor via a bus and configured to store instructions which, when executed by the processor, cause the network device to:
obtain a first precoding matrix, and
precode a channel state indication reference signal (CSI-RS) according to the first precoding matrix;
determine a quantity of ports used to send the CSI-RS to the user equipment,
select a precoding matrix from M CSI feedback precoding matrix codebooks, and constitute a first precoding matrix codebook by using the selected precoding matrix, wherein the first precoding matrix codebook comprises a precoding matrix corresponding to at least two ports, and M is a positive integer, and
select a precoding matrix corresponding to the determined quantity of ports from the first precoding matrix codebook as the first precoding matrix; and
a transmitter configured to send the precoded CSI-RS to user equipment.

11. The network device according to claim 10, wherein the instructions, when executed by the processor, further cause the processor to:;
select a precoding matrix whose quantity of layers is equal to the determined quantity of ports from an $i^{th}$ CSI feedback precoding matrix codebook, wherein i is a positive integer and $1<i \leq M$; and
add the selected precoding matrix to the first precoding matrix codebook.

12. A network device, comprising:
a processor;
a memory coupled to the processor via a bus and configured to store instructions which, when executed by the processor, cause the network device to:
obtain a first precoding matrix, and
precode a channel state indication reference signal (CSI-RS) according to the first precoding matrix;
a transmitter configured to send the precoded CSI-RS to user equipment;
a receiver configured to receive a feedback message of the user equipment for the first precoding matrix; and
wherein the instructions, when executed by the processor, further cause the network device to:
when the feedback message indicates that a precoding matrix indicator (PMI) corresponding to the first precoding matrix is not an available PMI of the CSI-RS, reobtain the first precoding matrix, and
when the feedback message indicates that a PMI corresponding to the first precoding matrix is an available PMI of the CSI-RS, precode the CSI-RS still according to the first precoding matrix, and send the precoded CSI-RS to the user equipment by using the transmitter.

13. The network device according to claim 12, wherein the receiver is configured to:
receive the feedback message of the user equipment for the first precoding matrix by using a physical uplink control channel (PUCCH), an enhanced physical uplink control channel (EPUCCH), or a physical uplink shared channel (PUSCH).

14. User equipment, comprising:
a bus;
a receiver coupled to the bus and configured to:
receive a precoded channel state indication reference signal (CSI-RS) sent by a network device, wherein the precoded CSI-RS is obtained after the network device precodes a CSI-RS according to an obtained first precoding matrix;
a processor coupled to the bus;
a memory coupled to the bus and configured to store instructions which, when executed by the processor, cause the user equipment to:
compare a parameter of the precoded CSI-RS with a preset parameter threshold, and:
when a relationship between the parameter of the precoded CSI-RS and the preset parameter threshold meets a preset condition, determine that a comparison result is that a precoding matrix indicator (PMI) corresponding to the first precoding matrix is an available PMI of the CSI-RS, and generate a feedback message for the first precoding matrix according to the comparison result, and
when a relationship between the parameter of the precoded CSI-RS and the preset parameter threshold does not meet a preset condition, determine that the comparison result is that a PMI corresponding to the first precoding matrix is not an available PMI of the CSI-RS, and generate the feedback message for the first precoding matrix according to the comparison result; and
a transmitter coupled to the bus and configured to:
send the feedback message for the first precoding matrix to the network device.

* * * * *